United States Patent [19]
Mitarai et al.

[11] Patent Number: 5,874,799
[45] Date of Patent: Feb. 23, 1999

[54] CONTROL DEVICE FOR A VIBRATION DRIVEN MOTOR

[75] Inventors: Reiji Mitarai, Hachioji; Hiroaki Takeishi, Yokohama, both of Japan

[73] Assignee: Canon Kabushiki Kaisha, Tokyo, Japan

[21] Appl. No.: 747,740

[22] Filed: Nov. 12, 1996

Related U.S. Application Data

[63] Continuation of Ser. No. 405,929, Mar. 17, 1995, abandoned, and Ser. No. 998,857, Dec. 30, 1992, abandoned.

[30] Foreign Application Priority Data

Jan. 6, 1992 [JP] Japan ................................ 4-000275

[51] Int. Cl.$^6$ ................................................. H01L 41/08
[52] U.S. Cl. ................................................. 310/316
[58] Field of Search ................................ 310/323, 316, 310/317; 318/116

[56] References Cited

U.S. PATENT DOCUMENTS

| | | | |
|---|---|---|---|
| 4,580,073 | 4/1986 | Okumura et al. | 310/323 |
| 4,727,276 | 2/1988 | Izukawa et al. | 310/316 |
| 4,998,048 | 3/1991 | Furutsu | 318/116 |
| 5,001,404 | 3/1991 | Kataoka | 318/116 |
| 5,013,982 | 5/1991 | Sasaki | 310/316 X |
| 5,023,526 | 6/1991 | Kuwabara et al. | 318/116 |
| 5,062,622 | 11/1991 | Kataoka et al. | 271/270 |
| 5,130,619 | 7/1992 | Izuno | 318/116 |
| 5,146,143 | 9/1992 | Furutsu | 318/116 |
| 5,155,418 | 10/1992 | Kataoka | 318/116 |
| 5,159,253 | 10/1992 | Shimizu et al. | 310/316 X |
| 5,165,047 | 11/1992 | Shimizu | 318/116 |
| 5,173,630 | 12/1992 | Tanaka | 310/316 |
| 5,198,732 | 3/1993 | Morimoto | 318/116 |
| 5,258,694 | 11/1993 | Ohnishi et al. | 318/135 |
| 5,285,134 | 2/1994 | Kataoka | 318/116 |

FOREIGN PATENT DOCUMENTS 0299771 1/1989 European Pat. Off. .

*Primary Examiner*—Mark O. Budd
*Attorney, Agent, or Firm*—Fitzpatrick, Cella, Harper & Scinto

[57] ABSTRACT

A control device for an ultrasonic motor includes a control calculation circuit for calculating position, i.e., the rotation amount and speed of the motor, a linearization function generation circuit for receiving the output signal from the control calculation circuit and outputting the amplitude information of a stator constituting the motor and the phase difference information of two driving signals for driving the stator, and a driving circuit responsive to the output signal from the generation circuit to supply the driving signals to the stator.

12 Claims, 13 Drawing Sheets

SINGL PEAK TYPE

MULTI PEAK TYPE

PRECIPITOUS DROP TYPE

SIN WAVE TABLE

CONTROL DEVICE FOR A VIBRATION DRIVEN MOTOR

This application is a continuation of application Ser. No. 08/405,929 filed Mar. 17, 1995, and application Ser. No. 07/998,857 filed Dec. 30, 1992, both now abandoned.

BACKGROUND OF THE INVENTION

1. Field of the Invention

This invention relates to a control device for a travelling wave type motor, and particularly to a control device for controlling the driving of a travelling wave type motor so as to be able to effect high-speed positioning and precise positioning of the motor.

2. Related Background Art

An example of the basic construction of a travelling wave type motor is comprised of two groups of piezo-electric elements having, for example, a positional phase difference of λ/4 therebetween and secured to a vibration resilient member formed into a circular ring-like shape, a vibrator for forming a travelling wave by the combination of two standing waves excited by AC fields having a time phase difference of 90° therebetween being applied to said two groups of piezo-electric elements, and a moving member brought into pressure contact with the travelling wave formed on a surface of said vibrator and driven by the frictional force with the travelling wave formed on a surface.

Also, the travelling wave type motor, because of its characteristics that the stability of low-speed rotation is good and that a high torque can be output, has the feature that it can directly drive a driven member without using an output transmitting mechanism such as a gear mechanism.

On the other hand, in a travelling wave type motor, three factors generally determine the parameters which make the speed variable, i.e., the amounts of operation; the amplitude value of the vibration of a stator, the driving frequency and the phase difference between two AC fields. These factors will hereinafter be referred to as the amplitude operation, the frequency operation and the phase difference operation.

Description will hereinafter be made of the problems when the amounts of operation of these three factors are individually varied.

(1) The amplitude operation is accurate to make the absolute value of the speed variable, but cannot operate the direction of the speed.

(2) In the frequency operation, as in the amplitude operation, the direction of the speed, i.e., the direction of movement, cannot be operated. Also, the travelling wave type motor utilizes the resonance characteristic of a vibration member and therefore, the operation of vibration amplitude by taking off the optimum frequency which is one of the natural frequencies is an operation which reduces driving efficiency, and is not preferable.

Further, the frequency characteristic of vibration, as shown in FIG. 3A of the accompanying drawings, cannot always be said to be of a smooth single peak property, and often is a degenerative characteristic as shown in FIG. 3B of the accompanying drawings wherein multi peaks overlap one another in a narrow band, or a characteristic as shown in FIG. 3C of the accompanying drawings which is liable to cause a "precipitous drop" phenomenon in which the right or left gradient becomes sharp in spite of a single peak property, and a desired speed has been difficult to obtain.

(3) In the phase difference operation, the phase difference between two phases is changed from −90° to 90°, and in principle, the speed can be operated as a vector including that direction.

However, the generation of a travelling wave is genuinely established at the phase differences ±90°, and at an intermediate value thereof, it allows the generation of an unnecessary standing wave and thus, has reduced driving efficiency. This standing wave is also a factor which damages the frictional material between a stator and a rotor and aggravates the durability of the motor.

From the above-noted points, an amplitude command is preferable as the amount of operation of the absolute speed value, and to change the direction of the speed, it is necessary to use a phase difference command in some way.

FIG. 2 of the accompanying drawings shows a block diagram of a control device according to the prior art. The reference numeral 100 designates a control calculator which outputs an amplitude command (torque strength) value and a rotation direction command value on the basis of the detected positional data and an input positional command. The reference numeral 300 denotes a driving circuit in which there are prepared an amplitude command input terminal and a phase difference changeover switch and to which are input the amplitude command value output from the control calculator 100 and the information of the rotation direction for changing over the phase difference.

In the driving circuit 300, the changeover of the phase difference is realized by reversing the waveform of one phase. These two control inputs correspond to the designation of the absolute speed value and the selection of the speed direction, and are subjects which cannot be handled as linear elements.

The operation of this control device is such that when a target position is first input to the control calculator 100, the operation direction is defined by the relation with the current position of the rotor of a motor 7 and a rotation direction command value is output to the driving circuit 300, which thus operates the phase changeover switch.

Next, the control calculator 100 calculates a control error, and outputs an amplitude operation command to the driving circuit so as to accelerate, fix and decelerate the speed in accordance with a speed profile such as a trapezoid.

The cycle of the operation pattern comprises the setting of the operation direction as an initial driving value, and the starting and stoppage of the operation in one direction, and if required, this cycle is repeated. As described above, in the control device according to the prior art, the control system is a control system comprising chiefly a sequence operation, and it has been difficult to use the travelling wave type motor as a sensitive servo system.

On the other hand, as another feature of the travelling wave type motor, mention may be made of the fact that a great holding torque is provided by a frictional force created by the moving member (hereinafter referred to as the rotor) being always in pressure contact with the vibrator (hereinafter referred to as the stator). In order to make the most of this feature, in the positioning of the travelling wave type motor, the operation of making the voltage given to the motor zero is performed after the termination of the positioning operation. This operation is readily realized by cutting off the electrical signal path to the motor and grounding the input end to the motor.

Now, the travelling wave type motor having the above-described feature has a brake function which is not possessed by an electromagnetic motor or a pulse motor and therefore, even if the electrical signal path to the motor is cut off when the positioning is terminated, that is, when the angular speed of the motor becomes zero and the position of the motor coincides with the target position, the travelling wave type motor can be said to potentially have a positioning operation ability much more excellent than that of the electromagnetic motor or the pulse motor.

However, if the electrical signal path is cut off before the angular speed of the motor becomes zero, the motor will be stopped in a short time by the frictional force between the rotor and the stator, but the motor will be rotated beyond the target position by its inertia force and therefore, may cause a reduction in positioning accuracy. If the angular speed is sufficiently small, the motor will be stopped in a moment by such frictional force and no position error will arise, but in any case, it is necessary to wait for the angular speed to become sufficiently small and therefore, it has been impossible to shorten the positioning time.

That is, as shown in FIG. 7 of the accompanying drawings, the positioning to the target position value r is such that the motor is accelerated until a time $t_7$, keeps a constant speed from the time $t_7$ until a time $t_8$, is decelerated after the time $t_8$ and is stopped at a time $t_9$. This locus on phase plane is shown in FIG. 8 of the accompanying drawings. In FIG. 8, the abscissa represents deviation e and the ordinate represents the differentiated value (e') of the deviation e.

On the other hand, it is often the case that the positioning operation is repeatedly performed, and the characteristic of the travelling wave type motor driven by frictional force is varied by a temperature change which is necessarily caused by the positioning operation being repeated and therefore, it has been difficult to obtain a stable positioning performance.

Also, due to problems in the working accuracy of a stator during the manufacture of the motor, the characteristic of the motor also differs by the stop angle of the rotor and therefore, if has been impossible to obtain a constant performance over the full periphery of the motor.

On the other hand, where the control device for the travelling wave type motor is grasped as a circuit element, in the output stage construction as shown, for example, in FIG. 10 of the accompanying drawings wherein electrical vibrations of two phases power-amplified by a pair of power amplifiers 200 are applied to the travelling wave type motor, the reference numeral 400 designates a driver comprising chiefly analog circuits such as an oscillation circuit and an amplitude modulating circuit, and a portion which performs an operation of high intelligence such as position control loop compensation is of a construction which shares the role with a microprocessor 500.

The function of the driver 400 basically is to electrically create ultrasonic vibrations of two phases. However, the conditions of two-phase output vibrations are:

1) That they are predetermined ultrasonic range frequencies;

2) That the frequencies of two phases are completely coincident with each other;

3) That they are equal to each other at a predetermined vibration amplitude;

4) That they have a predetermined phase difference therebetween; and

5) That they are sine wave vibrations free of strain.

Here, assuming, for example, pulse wave driving which does not impose condition 5) above, it can be relatively easily realized by the digital circuit technique to satisfy all the above conditions.

However, the vibrator of the travelling wave type motor generally has numerous harmonic wave resonance modes and thus, excites an unnecessary resonance mode for a pulse wave or a distorted vibration wave, and it is difficult to produce a uniform travelling wave. To obtain a driving force of good quality, it is a requisite condition for the two phases of the driving voltage to be genuine sine waves and satisfy an accurate synchronous relation.

In the prior art, a driving circuit which attempts to satisfy conditions 1) to 5) above has been constructed with chiefly analog elements as hardware, inclusive of digital elements.

However, the prior-art control device has been an elaborate circuit, but nevertheless could not be expected to be of high accuracy. This comes from a general problem peculiar to analog circuits. Here, the condition of the coincidence of a driving signal with piezo-electric elements of two phases can be satisfied at least steadily by installing an appropriate compensation loop, but as regards the condition of the absolute value such as the resonance frequency, it is difficult to enhance accuracy when the thermal drift of circuit elements is taken into account.

Also, to give the initial setting which takes the individual differences between travelling wave type motor bodies into account to such a driving circuit, a large cost and labor for regulation are required, and this has been a reason for the difficulty of mass production.

Further, it is desirable that the "predetermined values" of the frequency, amplitude and phase difference in the foregoing conditions can be arbitrarily changed as the amounts of operation of the travelling wave type motor, but it has been difficult to input all these amounts of operation to the circuitry of the hardware and process the same.

That is, the prior-art control device is of a type in which, for example, only an amplitude input is prepared in the driver 400 and is connected to the microprocessor 500 to thereby effect speed adjustment, and has been contented with a control system construction which denies the degree of freedom of operation.

Problems the present invention intends to solve are concerned with the following three points.

Firstly, the fundamental problem peculiar to the travelling wave type motor is that originally, speed is a vector amount having the speed and the direction at a time, nevertheless the travelling wave type motor is of physical structure in which two state amounts, i.e., the speed and the direction, are separated from each other.

This point indeed is the reason why the travelling wave type motor has been a non-linear element difficult to handle, and is a problem left to be solved. Further, the following problem is posed in practical use. As described above, in the prior art, it has not been taken into consideration to rotate the travelling wave type motor continuously in forward and reverse directions, and the prior-art travelling wave motor has been approximate to sequence control and could not assume a complete feedback control construction.

Where such prior art is used for positioning control, when overshoot occurs, the processes of stoppage, judgment and direction changeover come in the course of positioning, and this has been very disadvantageous from the point of the evaluation of the positioning time. Further, near the target point, there is an operation delay based on such a sequence operation and therefore, when the gain is high, hunting has remained, and when the gain is low, control deviation has remained.

Thus, in the prior art, accuracy and response speed could not be improved and the travelling wave type motor has been regarded as an actuator of low positioning performance. Also, in DC and AC motors which are other type actuators, the linearity between the amount of operation and the amount of control are good and various servo techniques such as classical and modern control theories can be applied to such motors, whereas the application of these powerful techniques to the prior-art travelling wave type motor has been impossible. The prior-art travelling wave type motor has been regarded as a special servo technique which is not in harmony with the linear control theory, and this has been the cause of the travelling wave type motor being unpopular among users.

A second problem is concerned with means for improving the response performance of positioning control, and is that there has not been discovered or practised appropriate means for effectively utilize the braking function of the travelling wave type motor itself.

A third problem is that the vibrator of the travelling wave type motor must be strictly resonated and there are many parameters regarding resonance and therefore, highly accurate sine wave vibration could not be generated and as a result, a uniform drive force could not be obtained, that the degree of freedom of driving could be realized only in a limited form and that hardware regulation was difficult.

SUMMARY OF THE INVENTION

An object of the present invention is to provide a control device for an ultrasonic motor which solves the above-noted disadvantages peculiar to the control device for the ultrasonic motor according to the prior art.

Another object of the present invention is to provide a control device for an ultrasonic motor in which the characteristic relationship between the amount of operation and the amount of control has linearity.

One aspect of the present invention is a control device of high accuracy realized by software.

Other features of the present invention will become apparent from the following detailed description of the invention.

DETAILED DESCRIPTION OF THE PREFERRED EMBODIMENTS

FIG. 1 shows a first embodiment of a control device for a travelling wave type motor according to the present invention.

Figure 1A:
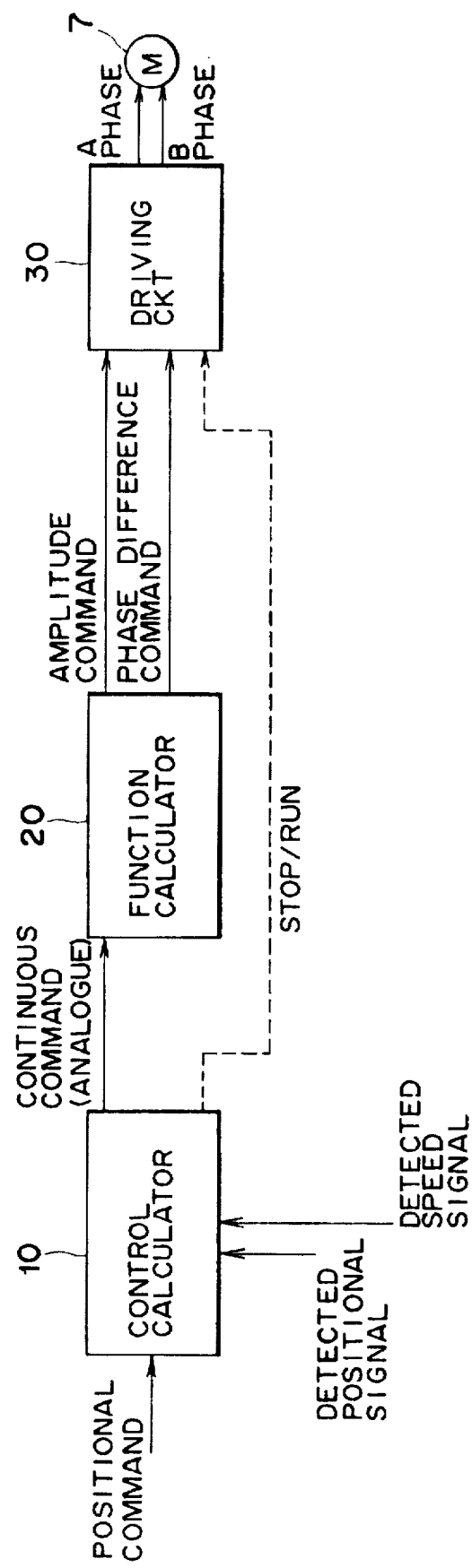
FIG. 1 (including FIGS. 1A to 1D) is a block diagram showing a first embodiment of the present invention.

FIG. 1A shows the general construction of the control device of the present embodiment, and the general construction is broadly comprised of a control calculator 10, a function calculator 20 and a driving circuit 30.

The control calculator 10 is of a construction which receives a positional command signal, a detected positional signal and a detected speed signal as inputs, and has two outputs, i.e., a continuous command (analog information) output and a two-condition (e.g. binary information of 0 and 1) command output.

Figure 1B:
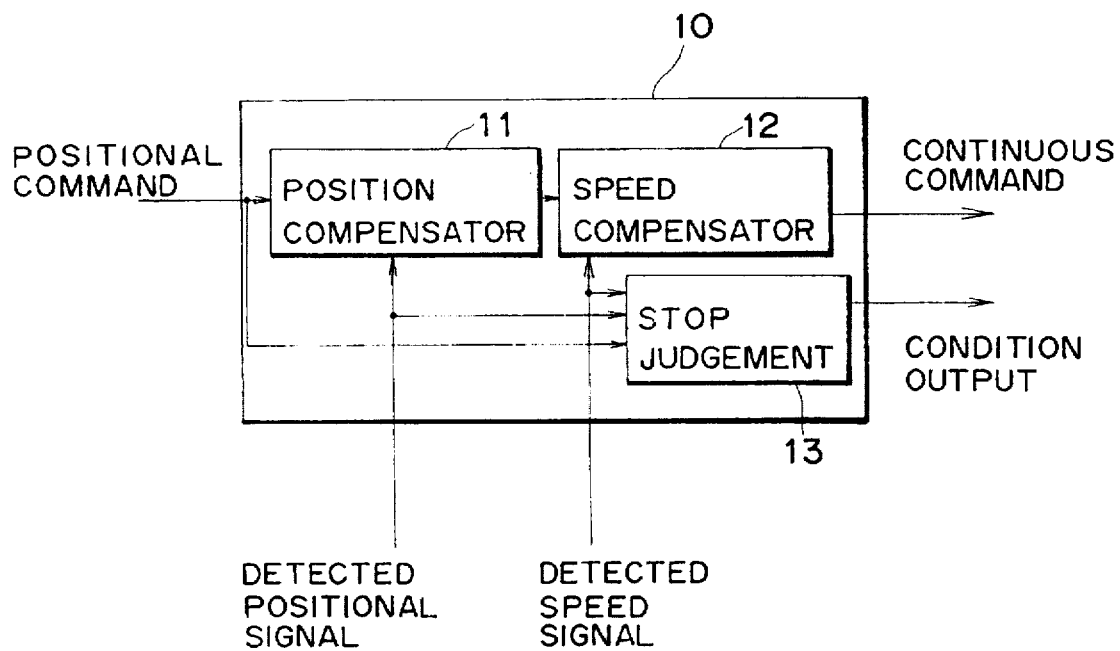

The construction of the control calculator 10, as shown in FIG. 1B, comprises a position compensation calculator (compensator) 11, a speed compensation calculator (compensator) 12 and a stop judgment calculator 13. The position compensation calculator 11 and the speed compensation calculator 12 are in a series-coupled relation and output continuous commands, and the position compensation calculator 11 receives a positional command and a detected positional signal as input information, and outputs a speed command signal to the speed compensation calculator 12.

The speed compensation calculator 12 receives as input information a detected speed signal and a speed command signal from the position compensation calculator 11, and outputs speed information as an analog signal.

This route is equal to the compensation calculation route of an ordinary servo system, and the continuous signal output thereof corresponds to the amount of operation to an object to be controlled.

In the present embodiment, the detected speed signal is an outside input, whereas the detected speed signal is not always necessary, but can also be substituted for by a differential calculation from the detected positional signal.

The stop judgment calculator 13 outputs a motor stop signal $F_{stop}$ for instructing the stoppage (output "1") and running (output "0") of the motor from a position control deviation amount e which is the result of a comparison between the position command signal and the detected positional signal, and the detected speed signal v. This motor stop signal $F_{stop}$ is output by the logical calculation shown below.

$$F_{stop} = \begin{cases} 1 |e| < \epsilon_1 \text{ and } |v| < \epsilon_2 \\ 0 \text{ (others)} \end{cases}$$

where $\epsilon_1$ and $\epsilon_2$ are constants of sufficiently small positive values.

Figure 1C:
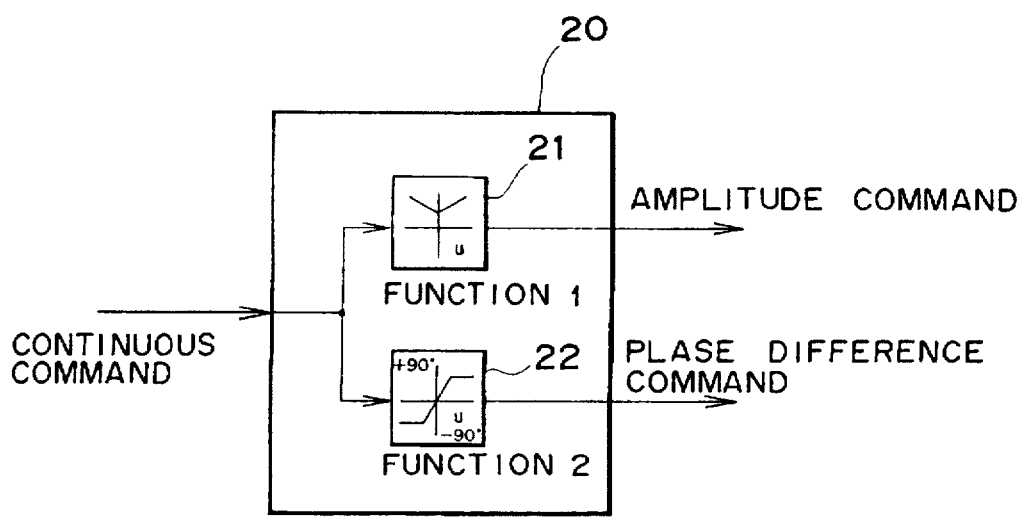

The linearization calculator 20, as shown in FIG. 1C, is comprised of two non-linear function devices 21 and 22 conforming to the continuous command output put out from the control calculator 10.

The function device 21 has an amplitude function 1 (a continuous signal u on the horizontal axis, and an amplitude signal on the vertical axis) and outputs an amplitude command signal Ru to a function driving circuit 30, and to the input value u, the calculation is Ru=|u|+bias, where bias is a positive constant and physically, it corresponds to the maximum insensitive value of the amplitude of a stator, and is related to the plane accuracy of the friction surface between the stator and rotor.

The function device 22 has a phase difference function 2 (a phase angle on the vertical axis, and a continuous signal on the horizontal axis) and outputs a phase difference command $\phi$ given to the driving circuit 30 by the calculation shown below.

$$\phi = \begin{cases} +90° & (u \geq \delta) \\ 90° \ u/\delta & (\delta > u > -\delta) \\ -90° & (-\delta \geq u) \end{cases}$$

where $\delta$ is a positive constant. When $\delta$ is sufficiently small, $\phi$ is a direction changeover signal having two values ±90°.

Figure 1D:
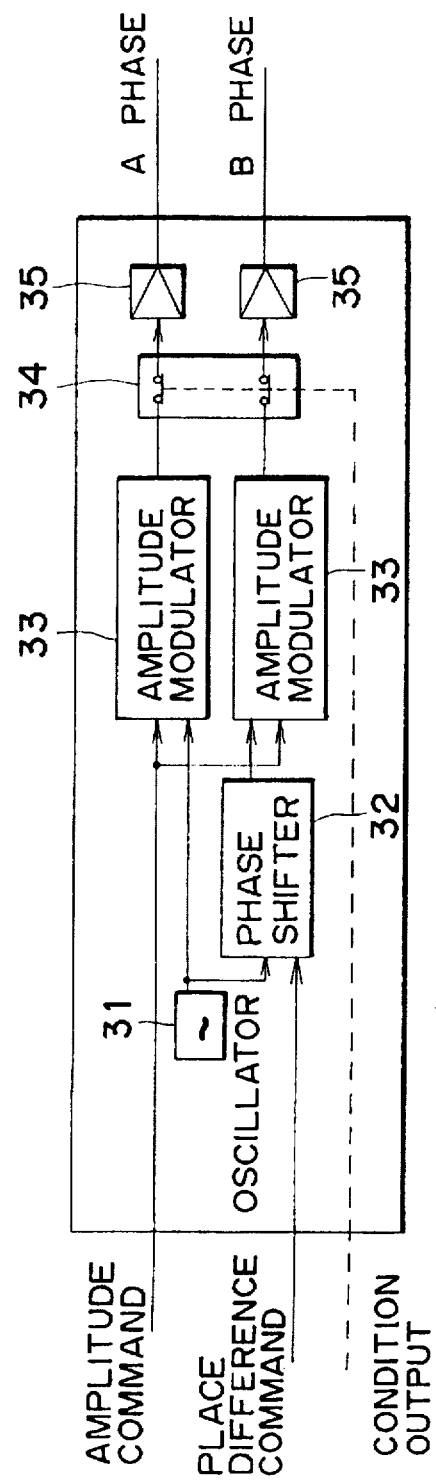
Figure 2:
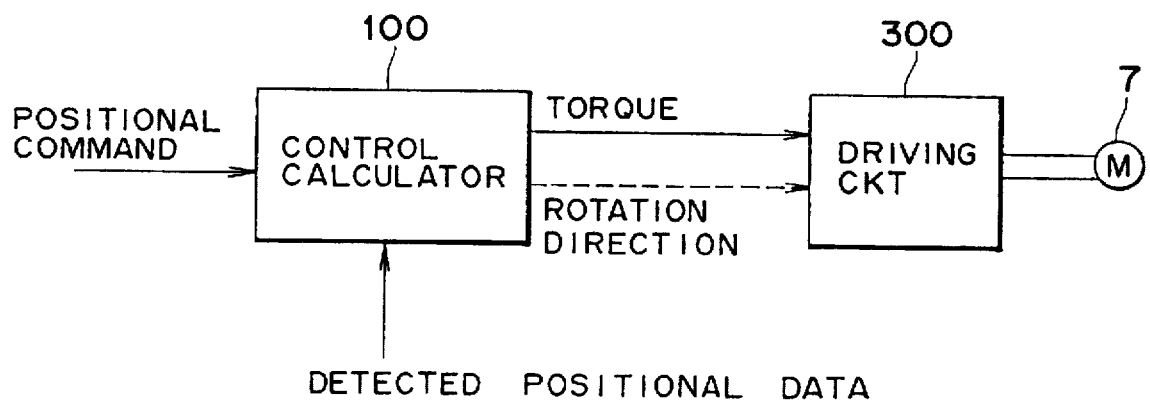
FIG. 2 shows a control device for a travelling wave type motor according to the prior art.
Figure 3A:
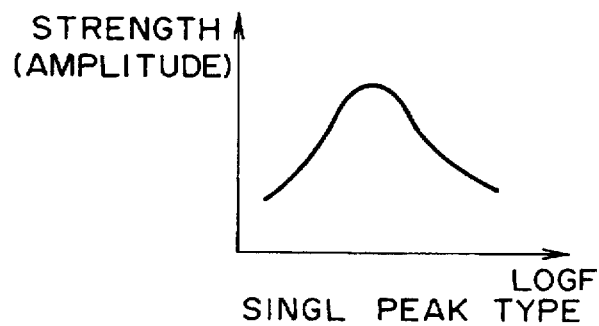
FIG. 3 (including FIGS. 3A to 3C) shows the resonance characteristic of a vibration member.
Figure 3B:
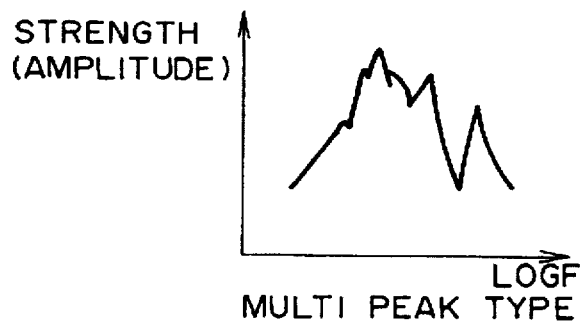
Figure 3C:
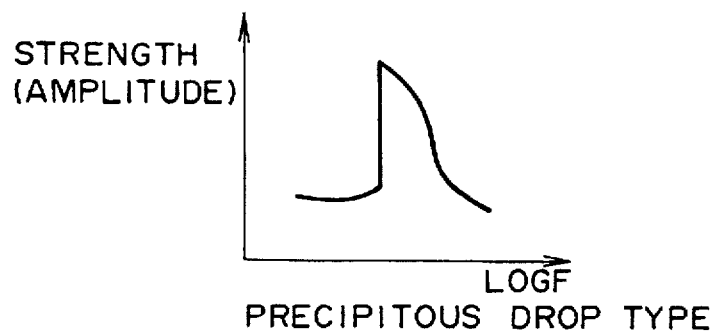

The driving circuit 30, as shown in FIG. 1D, receives an amplitude command signal, a phase difference command signal and a stop/run command signal as inputs, outputs vibration wave power of two phases and gives it to the travelling wave type motor. The internal construction of the driving circuit 30 comprises chiefly an oscillator 31, a phase shifter 32, a pair of amplitude modulators 33 and a pair of power amplifiers 35, and the phase shifters 32 for determining the phase difference between the two phases are inserted between one of the amplitude modulators 33 and the output of the oscillator.

Also, a signal interrupter 34 for both phases is installed at the input point of the power amplifiers and is designed to operate in response to a stop/run command.

The signal interruption here is to give a zero input to the power amplifiers 35, and means for grounding. Accordingly, the vibration of the stator is stopped by the signal interruption, and at this time, the travelling wave type motor is designed to be fixed by a frictional force created by the pressing between the stator and rotor.

The principle of the operation of the control device of the above-described construction, particularly the linearization calculator (non-linear function calculator) 20, will hereinafter be described.

Originally, velocity is a vector amount having a speed and direction at a time. Accordingly, it is desirable that control input also be handled as a vector amount to control the velocity.

This vector amount should have an input space ranging from the negative to the positive, including zero. The linearization calculator 20 is used as means for integrating two amounts of operation, i.e., the speed at which the travelling wave type motor is driven and the direction thereof, and for causing them to follow said vector operation amount. Here, considering the non-linear functions of one input and two outputs shown in FIG. 1C, the input signal is a vector operation amount, and an amplitude command and a phase difference command are output. Here, the speed and the amplitude of the stator are in a physically proportional relation.

This non-linear function calculator 20 basically produces an amplitude command value from the calculation of the absolute value of the vector operation amount, and maps the two values ±90° which provide a phase difference command from the sign thereof.

That is, the amplitude function device 21 is given a bias value related to the insensitive value of the vibration of the stator, and the phase difference function device 22 is provided with a linear area effective during fine driving.

Thus, the transfer characteristic from the input of the vector operation amount to the output of the speed of the travelling wave type motor can be made linear.

From this, it follows that a control system using the travelling wave type motor can be made into a feedback construction and various linear servo techniques can be effectively utilized to display a high control performance.

Figure 4:
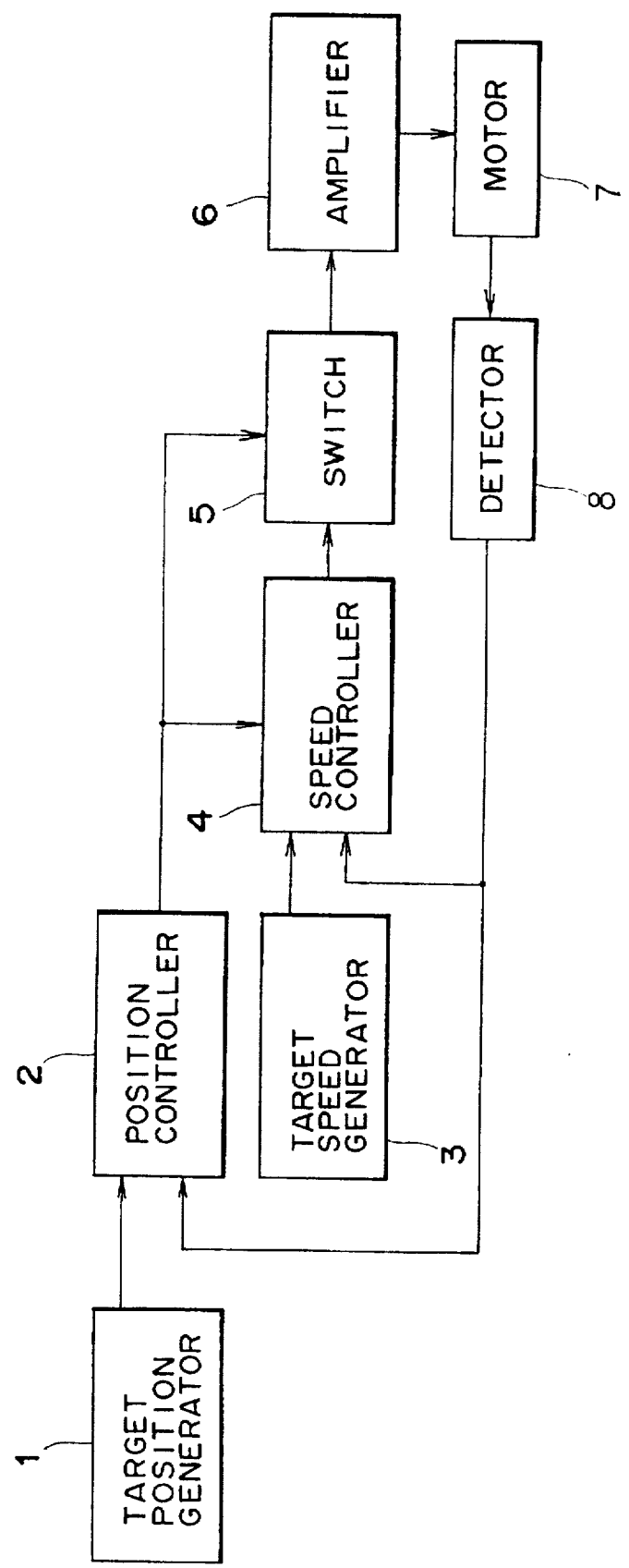
FIG. 4 is a block diagram showing a second embodiment of the control device for the travelling wave type motor according to the present invention.

FIG. 4 shows a second embodiment of the control device according to the present invention.

In FIG. 4, the reference numeral 7 designates a travelling wave type motor of the same type as the motor designated by 7 in FIG. 1, i.e., the motor shown in U.S. Pat. No. 4,580,073 or U.S. Pat. No. 5,146,143, and driven by the motor command signal from a power amplifier 6 being input to driving piezo-electric elements of e.g. two phases on which a stator is provided. The reference numeral 8 denotes a detector for detecting, for example, the rotation of the rotor of the travelling wave type motor to thereby detect the position and speed thereof. As the detector 8, use is made of a rotation detector (LRE) using, for example, a laser beam and capable of effecting highly accurate position detection and speed detection, and in the present embodiment, use is made of a detector capable of outputting 81,000 sine waves per revolution.

The reference numeral 1 designates a target position generator for generating a target position signal, the reference numeral 2 denotes a position controller, the reference numeral 3 designates a target speed generator for generating a target speed signal, the reference numeral 4 denotes a speed controller, and the reference numeral 5 designates a switch.

The position controller 2 receives as inputs the target position information from the target position generator 1 and the position information from the detector 8, outputs a switch closing signal to the switch 5 and the speed controller 4 and also outputs driving start information to the target speed generator 3.

The target speed generator 3 outputs a preset target speed value to the speed controller 4 when the driving start information is input from the position controller 2 thereto.

The speed controller 4 produces AC fields to be applied to the driving piezo-electric elements of two phases of the travelling wave type motor, regulates the time phases, amplitudes, frequencies, etc. of the AC fields of the two lines with the target speed value from the target speed generator 3 and the speed information from the detector 8 as input information, and outputs them as a motor command signal.

Also, design is made such that when the switch closing signal from the position controller 2 is input, a set value or the like is reset so as to eliminate the influence upon the next driving operation. The motor command signal output from the speed controller 4 is amplified by the power amplifier 6 through the switch 5 and is applied to the motor 7.

That is, the speed information detected by the detector 8 is fed back to the speed controller 4 to thereby construct a speed feedback loop, and the position information detected by the detector 8 is fed back to the controller 2 to thereby construct a position feedback loop.

Figure 5A:
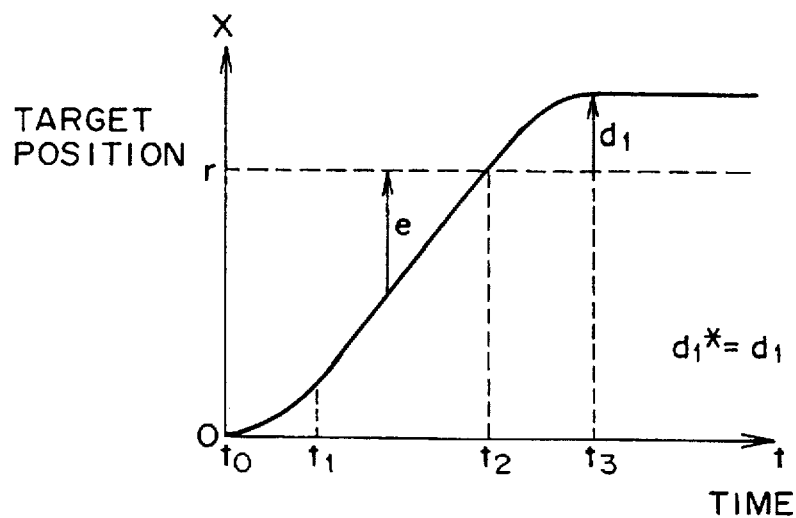
FIG. 5 (including FIGS. 5A and 5B) illustrates the operation of the first embodiment.
Figure 5B:
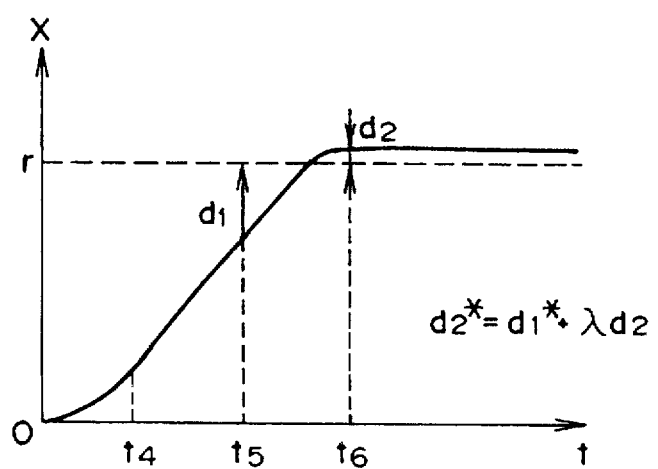
Figure 7:
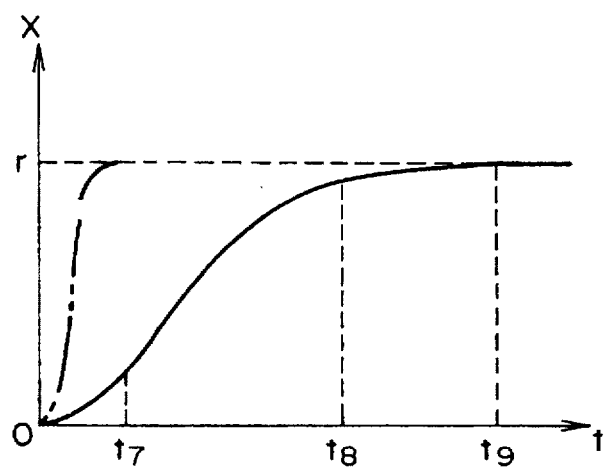
FIG. 7 shows a positioning control device for the travelling wave type motor according to the prior art.

The control device for the travelling wave type motor of the above-described construction controls the speed controller 4, etc. by the position controller 2 and can position the motor at the target position value within a short time and accurately as indicated by dots-and-dash line in FIG. 7, and the construction of the position controller 2 forming the center of such control will hereinafter be described by the use of the operation procedure from the start to the end of the positioning operation shown in FIG. 5. FIG. 5 represents the response of the motor position by the use of a time response waveform, and for the simplification of description, it is to be understood that the target speed and the amount of position movement are predetermined values and the motor is stopped after the motor speed reaches the target speed. In FIGS. 5A and 5B, the target position value is indicated by r, the motor position is indicated by x, the positional deviation is indicated by e (i.e., e=r−x), and the time is indicated by t.

The position controller 2 has a positional deviation detecting function, a motor stoppage judging function, a overshoot amount foreseeing function and a switch changeover function, and normally monitors the position information (x) from the detector 8 by the positional deviation detecting function and outputs the positional deviation e which is the difference between the target position value r and the target position generator 1.

For example, where the travelling wave type motor is step-driven by the control device, when the driving start signal is output from the position controller 2 to the target speed generator 3 at a time $t_0$ when the motor is in its stopped state, the motor 7 is driven in accordance with the target speed value generated by the target speed generator 3.

When the driving of the motor 7 is started, position information and speed information are output in succession from the detector 8, and when the speed controller 4 detects that the target speed has been reached (time $t_1$), the motor 7 is thereafter driven at this target speed. In that case, the positional deviation detecting function is monitoring the motor position by the position information from the detector 8, and at the moment when the target position r has been reached, that is, when the positional deviation becomes 0, the switch changeover function operates to change over the switch 5 from its closed state to its open state and to render the input voltage to the motor 7 zero (time $t_2$).

Here, the power supply to the motor 7 is stopped and the rotor is frictionally held on the stator by pressure force, but the rotor is stopped (time $t_3$) after it has passed the target position r by $d_1$, by the angular speed energy at the time $t_2$. Whether the rotor has been stopped is judged, for example, by the motor stoppage judging function judging that the value output from the positional deviation detecting function does not vary for a predetermined time, and this value $d_1$ (the overshoot amount) is detected by the positional deviation detecting function.

On the other hand, the controller 2 at this time renders the foreseen value $d_1^*$ of the overshoot amount during the next stepping operation equal to the current overshoot amount $d_1$, i.e., $d_1^*=d_1$, by the overshoot amount foreseeing function, and this completes the first positioning operation.

When the second positioning operation is entered, as shown in FIG. 5B, the motor moves at the target speed (time $t_4$). From the second and subsequent positioning operations, the switch changeover function determines the time for the changeover of the switch 5 by the use of the positional deviation e of the rotor detected by the positional deviation detecting function which normally monitors the position of the rotor and the foreseen value $d_1^*$ of the overshoot amount determined during the last positioning operation.

That is, the switch changeover function brings the switch 5 into its closed state to thereby continue the operation of the motor 7 when the positional deviation e is in the relation that e>$d_1^*$, and in the other cases, changes over the switch 5 to its open state to thereby stop the motor 7.

Here, when e=$d_1^*$ is attained (time $t_5$), the switch 5 is brought into its open state by the motor stoppage judging function, whereby the power supply to the motor 7 is cut off, but the rotor overshoots and therefore, when the motor stoppage judging function judges the stoppage of the rotor, the overshoot amount $d_2$ in the second positioning operation is detected by the positional deviation detecting function at that point of time (time $t_6$).

When the overshoot amount $d_2$ in the second positioning operation is detected, the overshoot amount foreseeing function corrects the foreseen value $d_1^*$ of the first overshoot amount into $d_2^*$. The correcting method is given by the following equation:

$$d_2^*=d_1^*+\lambda \times d_2,$$

where $\lambda$ is a positive real number equal to or less than 1, and the more approximate to 1 is $\lambda$, the greater becomes the amount corrected by one positioning operation.

With regard to the third and subsequent operations, an operation similar to the second operation is repeated, and the positioning operation is performed while the foreseen value $d_n^*$ of the overshoot amount is renewed for the switch changeover at the target speed during each positioning operation.

The method of renewing the foreseen value $d_n^*$ of the overshoot amount can generally be determined as follows:

$$d_n^*=d_{n-1}^*+\lambda \times d_n$$

Thereby, $d_n^*$ gradually becomes approximate to the optimum foreseen value of the overshoot amount and becomes the accurate foreseen value of the overshoot amount in each stepping operation and therefore, precise positioning can be accomplished by the above-described procedure. Also, even if the characteristic of the motor varies, the variation can be coped with. Supplementing the method of determining $\lambda$, the more approximate to 1 is $\lambda$, the higher becomes the renewing speed, but along therewith, the convergency of $d_n^*$ is aggravated. $\lambda$ is determined with this point in mind. If required, $\lambda$ may not be rendered into a predetermined value, but suitable scheduling may be effected.

Figure 6A:
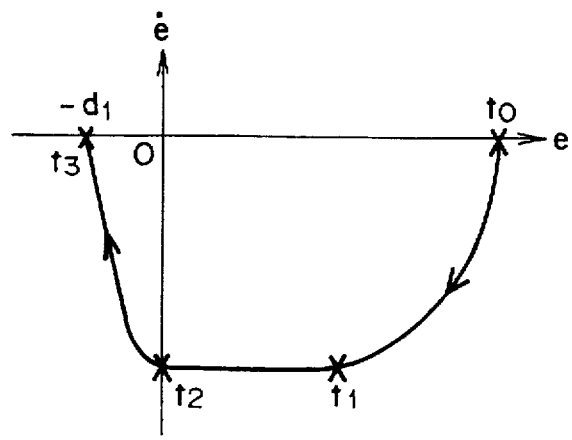
FIG. 6 (including FIGS. 6A and 6B) shows a locus on phase plane corresponding to the illustration of FIG. 5.
Figure 6B:
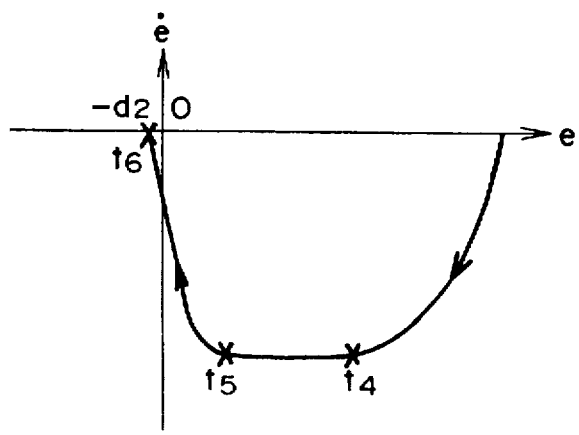

FIGS. 6A and 6B express the time response waveforms in the positioning operations shown in FIGS. 5A and 5B by loci on a phase plane. In these figures, e' represents the time differential of the deviation e. Rapidly applying a brake due to the electrical signal path to the motor being cut off appears as a great inclination of the locus on the phase plane. The above-described procedure of the stepping operation from the start of the driving to the nth time teaches the optimum timing for bringing orbit onto this straight line of great inclination and enables rapid and highly accurate positioning to be accomplished.

Figure 8:
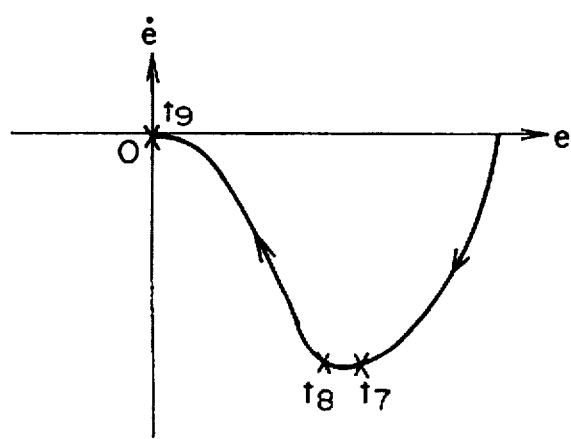
FIG. 8 shows a locus on phase plane corresponding to FIG. 7.

The effect of the present embodiment will now be described on the basis of the differences from the prior art of FIGS. 7 and 8. FIGS. 7 and 8 show the time response waveform and the locus on a phase plane, respectively, correspondingly to FIGS. 5 and 6. In the prior art, after the target speed is reached (time $t_7$), the motor speed is made sufficiently low (time $t_8$). This is for preventing the occurrence of the overshooting of the motor position from the point of time at which the switch 5 is changed over. It is then waited for the rotor position to reach the target position, and the switch 5 is changed over to thereby stop the driving of the motor (time $t_9$).

Therefore, it is impossible to bring the rotor close to the target position at a great speed and the positioning time cannot be shortened.

According to the present embodiment, however, not only the positioning accuracy up to the minimum resolving power of the position detector 8 can be achieved, but also the braking performance of the travelling wave type detector 8 can be effectively utilized to stop the motor quickly and therefore, the rotor can approach the target position at a great speed and thus, the positioning time can be shortened.

Also, the foreseen value of the overshoot amount is renewed during each positioning operation and therefore, a stable positioning performance can be realized without being affected by the irregularity of the characteristics of individual motors or changes in the characteristics or changes in the environment.

In the above-described embodiment, positioning control is effected from the second positioning on the basis of the foreseen value of the overshoot amount, but if an appropriate value is preset as the initial value, a stable operation can be performed from the first positioning operation.

Also, when the operation of the positioning device itself is terminated, the foreseen value of the overshoot amount is backed up and when the positioning device is used the next time, this foreseen value is used to effect positioning, whereby a stable positioning performance can always be obtained.

As the method of renewing the foreseen value $d_n*$ of the overshoot amount, use can also be made of methods other than the method mentioned in the above embodiment. For example, the overshoot amounts at L times in the past may be averaged and the foreseen value $d_n*$ may be determined as shown below.

$$d_n* = \sum_{i=n-L+1}^{n} d_i/L$$

Further, in the above-described embodiment, use is made of a constant target speed value and a constant position movement amount. Alternatively, any target speed value waveform may be used for the positioning operation at any position movement amount.

In such case, the motor speed at the point of time whereat the switch 5 has been changed over can be stored in memory by the controller at the same time and the foreseen value of the overshoot amount as a function relative to the motor speed can be renewed in each positioning operation.

In such case, if the foreseen value of the overshoot amount for a certain speed is not yet observed, a stable positioning performance can always be realized if a foreseen value already observed is interpolated and used.

Figure 9:
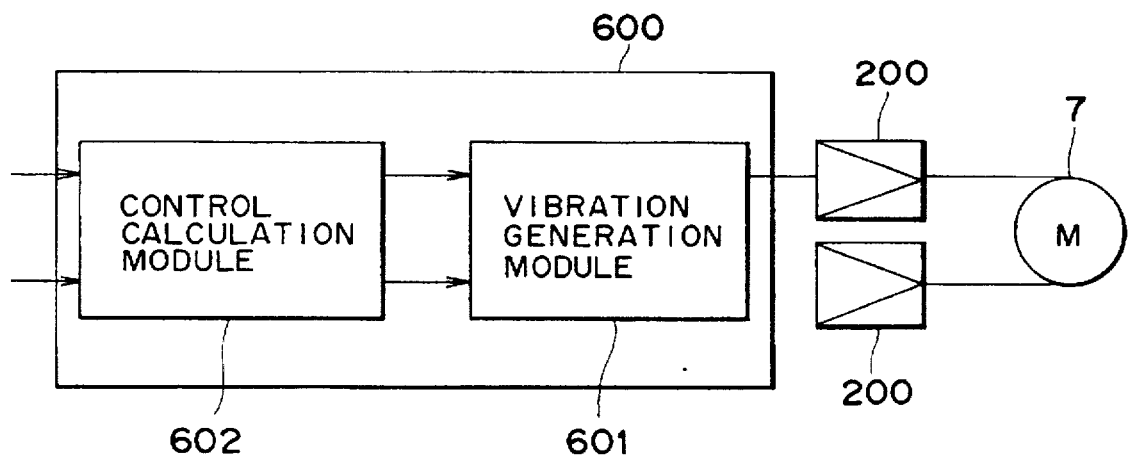
FIG. 9 shows a third embodiment of the present invention.
Figure 10:
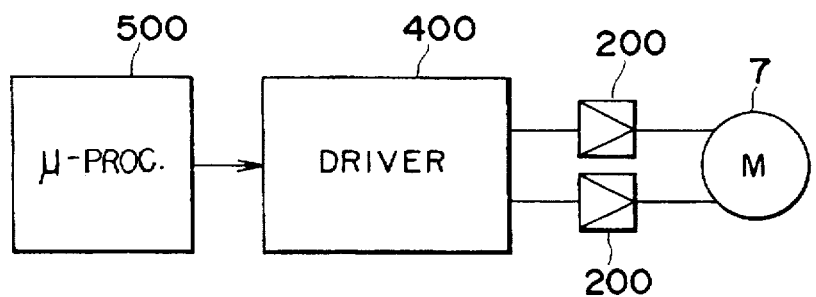
FIG. 10 shows a control device for the travelling wave type motor according to the prior art.

FIG. 9 shows a third embodiment of the control device according to the present invention.

In FIG. 9, the reference numeral 600 designates a driving device which is a high-speed digital calculator (for example, a digital signal processor), and a power amplifier 200 and others at the output stage are similar to those in the example of the prior art and therefore need not be described. The processing speed of the high-speed digital calculator 600, i.e., the frequency used for the driving of the driven motor, i.e., the travelling wave type motor, is an ultrasonic wave (20 KHz or more) and therefore satisfies a calculation speed at which an ultrasonic sine wave can be sufficiently output.

Broadly two software modules are prepared in the high-speed digital calculator 600, and one of them is a vibration generation module 601 which generates vibration waveforms of two phases for driving, and the other is a control calculation module 602 which receives as inputs a position command signal and a detected position signal from the outside and has the function of effecting position loop compensation calculation and speed loop compensation calculation and outputting an amplitude command signal and a phase difference command signal. The vibration generation module 601 receives the output values from the control calculation module 602 and outputs sine waveforms of two phases having these values as parameters to the power amplifier 200.

The generation of a sine wave by the vibration generation module 601 will hereinafter be described.

Figure 12A:
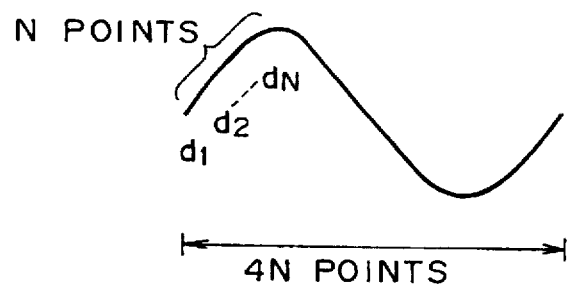
FIG. 12 (including FIGS. 12A and 12B) illustrates the operation of the third embodiment.
Figure 12B:
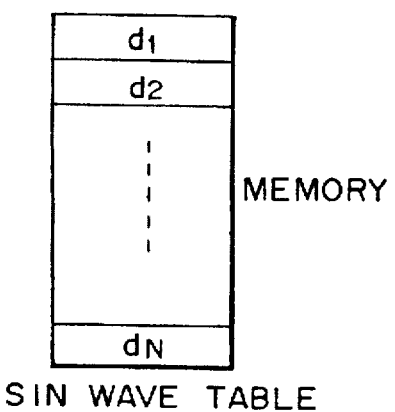

Data ($d_1, d_2, \ldots, d_N$) at N points corresponding to the quarter wavelength of a sine wave shown in FIG. 12A are prewritten in a memory shown by the sine wave table of FIG. 12B.

Data $\{S(i)\}$ ($i=1, 2, \ldots, 4N$) for each wavelength of the sine wave are obtained by the following calculation;

$$S(i) = \begin{cases} d_i & (1 \leq i \leq N) \\ 1 - d_{i-N} & (N+1 \leq i \leq 2N) \\ -d_{i-2N} & (2N+1 \leq i \leq 3N) \\ d_{i-3N} - 1 & (3N+1 \leq i \leq 4N) \end{cases}$$

Figure 13:
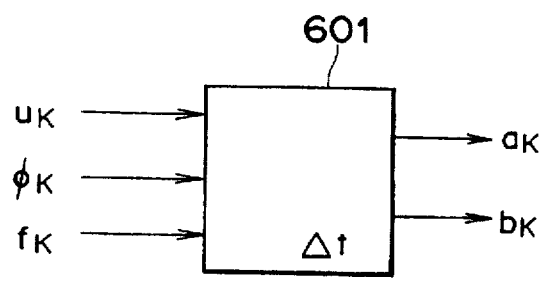
FIG. 13 shows the input and output of the third embodiment.

If here, for simplicity, the output frequency is fixed, the vibration generation module 601, as shown in FIG. 13, is given a speed value $u_k$, a direction value $\phi_k$ and a frequency value $f_k$ as input signals, and at a calculation period $\Delta t$, the outputs $a_k$ and $b_k$ to the power amplifiers of the driving A phase and B phase of the travelling wave type motor are:

$a_k = S(\text{mod}(k))$ (A phase)

$b_k = S(\text{mod}(k+\phi_k))$ (B phase)

$\phi_k$ is $-N \leq \phi_k \leq N$, and corresponds to the phase difference $-90°-90°$. Also, mod (·) represents a residue having modulo 4N. Here, the relation among the calculation period $\Delta t$, the data size N and the frequency f is $4 \cdot N \cdot f \cdot \Delta t = 1$.

Figure 14:
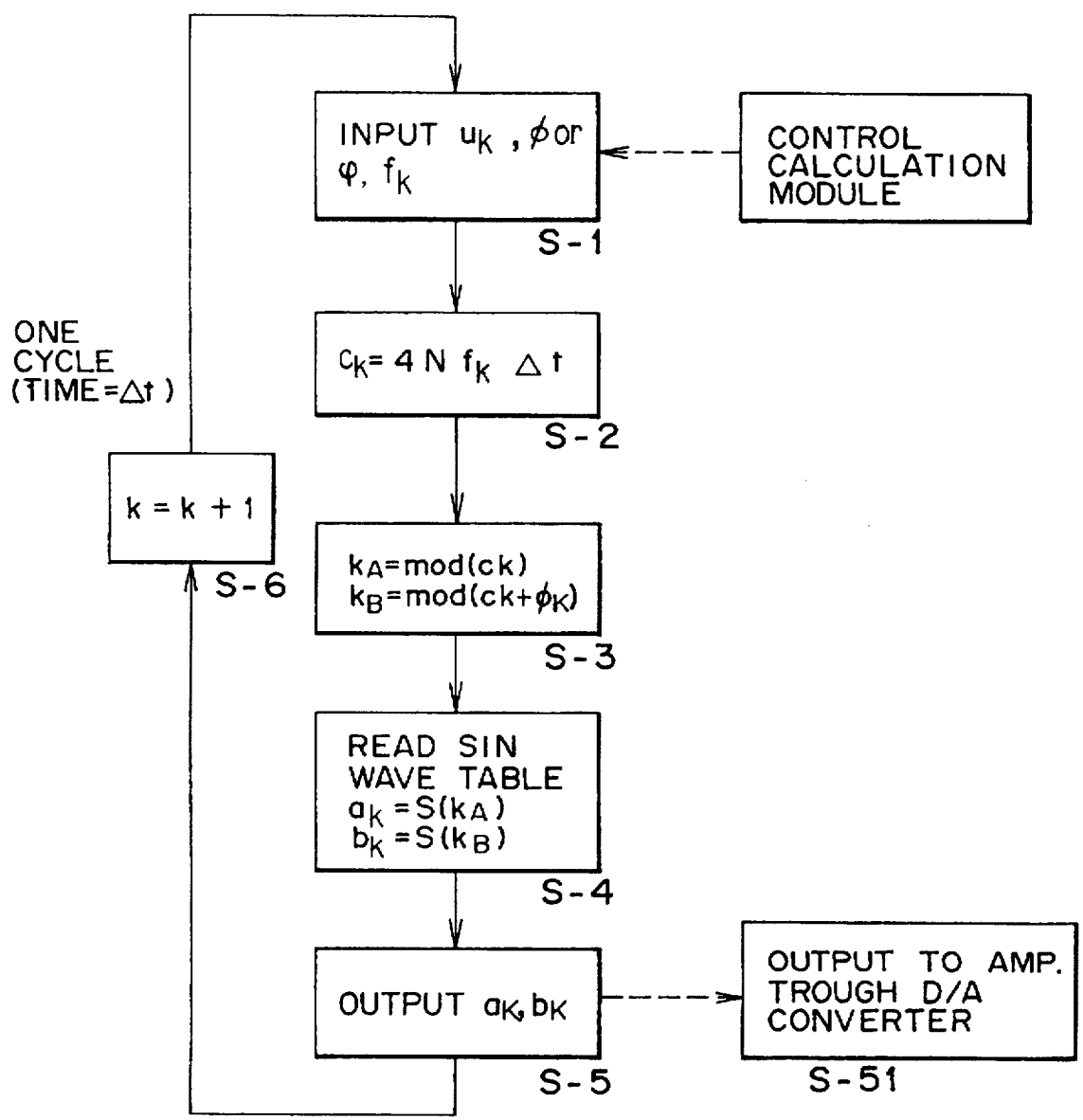
FIG. 14 is a flow chart illustrating the operation of the third embodiment.

FIG. 14 shows a flow chart when the frequency is made variable.

When the speed value $u_k$, the phase difference value $\phi_k$ and the frequency value $f_k$ are first given from the control calculation module 602 (S-1), the high-speed digital calculator 601 calculates a constant c ($c = 4Nf_k \Delta t$) (S-2), finds data points corresponding to the frequencies for A phase and B phase on the basis of this constant c (S-3), reads out the outputs ($a_k, b_k$) for A phase and B phase, respectively, from the sine wave table (S-4), and puts out these (S-5). It inputs them to the power amplifier 200 through a D/A converter (S-5), while on the other hand, it increments k by 1 (S-6). The above calculation is effected during $\Delta t$, and again with $k = k+1$, the calculation and outputting of S-1 and subsequent steps are effected.

That is, a sine wave of 20 KHz or more for use for the driving of the travelling wave type motor can be generated by digital calculation and therefore, the sine wave obtained can be an ideal two-phase sine wave incomparable to that obtained by analog generation or by the prior-art method of passing a rectangular wave through a coil or the like to thereby produce a sine wave, and if this is applied, for example, to the first embodiment shown in FIG. 1, the positioning thereof can be controlled more accurately.

Also, any change in the frequency can be dealt with on the spot and for example, driving control at a frequency optimum to the travelling wave type motor becomes possible and thus, a stable driving control of the travelling wave type motor can be accomplished.

Of course, this can also be applied to the control device of the second embodiment shown in FIG. 6, and if the above-described first and second embodiments are combined and these circuits are formed by the high-speed digital calculator of the present embodiment and are made into one chip, the features of these embodiments such as highly accurate positioning and good operability can be realized by a small device.

Figure 11:
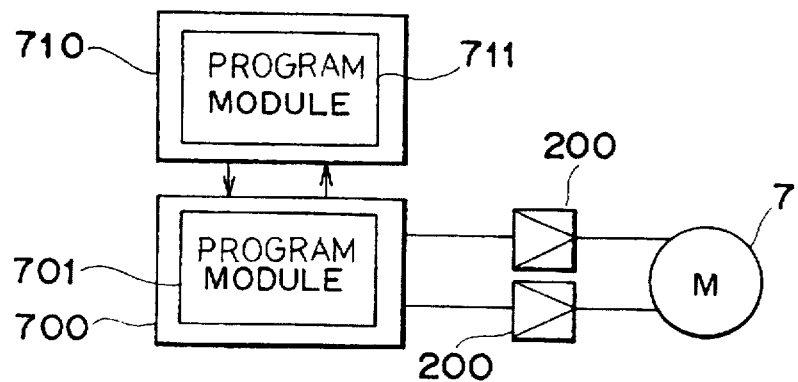
FIG. 11 shows a fourth embodiment of the present invention.

If in the third embodiment shown in FIG. 9, the condition that the driving circuit and control circuit are made into one chip is removed, then other numerous embodiments could be constructed, but here will be shown only one example. FIG. 11 shows a construction in which processes including ultrasonic wave vibration generation of the highest calculation frequency and amplitude modulation calculation are borne by a high-speed calculation chip 700 and a software module 701 and other processes regarding control calculation, communication, etc. are carried out by another high-speed calculation chip 710 and another software module 711. By thus using a plurality of high-speed digital calculators, a calculation load concerned with the generation of a vibration waveform of several tens of kilohertz and control calculation can be reduced.

According to the present invention, in the positioning of the travelling wave type motor, it is possible to obtain a rapid and precise positioning performance and moreover, a uniform and stable performance can be obtained even for any change or irregularity of the characteristic of the motor itself. Thereby, the effects of higher accuracy and higher speed as an actuator for the travelling wave type motor can be obtained.

Also, the continuous rotation of the travelling wave type motor in forward and reverse directions becomes possible, and this enables the travelling wave type motor to be handled as an apparent linear element. From this, operability comparable to that of a DC servo-motor is first obtained and the affinity with the ordinary servo technique is obtained. As a result, a system including the travelling wave type motor can be made into a feedback control construction, and the travelling wave type motor can make the most of features such as low speed range high torque and great holding which cannot be found in conventional motors, and can provide a positioning actuator of high performance.

Further, the driving condition of the travelling wave type motor by digital calculation can be satisfied highly accurately and driving of good quality is possible and in addition, a plurality of operation amounts can be cooperatively selected arbitrarily at a time from among the amplitude, the phase difference and the resonance frequency, and an actuator operation based on various vibration characteristics which could heretofore not be realized becomes possible. The advantages resulting from the travelling wave type motor being made into software are clear. But particularly, adjustment during shipping and adaptation and adjustment during operation are made possible or easy for the difference between products and the fluctuation of characteristic with time for various parameters which are problems in the vibration characteristic of the currently available travelling wave type motors.

What is claimed is:

1. A vibration motor apparatus, in which frequency voltage signals having predetermined phase differences are applied to an electro-mechanical energy conversion element portion disposed on a vibration member, said conversion element portion including a plurality of electro-mechanical energy conversion element groups to each group of which a respective voltage signal having a different phase is applied, thereby generating in the vibration member a vibration as a driving force, the apparatus comprising:

a continuous command forming circuit for forming a single continuous command signal representing a command value which varies within a predetermined range from a first command value to a second command value including a predetermined command value located therebetween;

an amplitude signal forming circuit, connected to said command forming circuit, for forming an amplitude signal having a corresponding amplitude value for a command value when the command value varies from the first command value to the second command value, said amplitude signal forming circuit forming an amplitude signal which shifts the amplitude value from a first amplitude value to a second amplitude value when the command value shifts from the predetermined command value in a direction of the first command value, and forming an amplitude signal which shifts the amplitude value from the first amplitude value to the second amplitude value when the command value shifts from the predetermined command value in a direction of the second command value, opposite in direction to the first command value;

a phase difference signal forming circuit, connected to said command forming circuit, for forming a first phase difference signal representing a first phase difference when a command value represented by the continuous command signal indicates a command value shifted from the predetermined command value in a direction of the first command value, the first phase difference generating a driving force in a first driving direction of the motor, and for forming a second phase difference signal representing a second phase difference when a command value represented by the continuous command signal indicates a command value shifted from the predetermined command value in a direction of the second command value, the second phase difference generating a driving force in a second driving direction of the motor;

a first control circuit for adjusting a vibration amplitude amount of the frequency voltage signals to a value corresponding to the value of an amplitude signal from said amplitude signal forming circuit; and a phase difference setting circuit for setting a phase difference of the frequency voltage signals to a first phase difference in response to a first phase difference signal from said phase difference signal forming circuit, and for setting a phase difference of the frequency voltage signals to a second phase difference in response to a second phase difference signal from said phase difference signal forming circuit, wherein an amount of driving force and driving direction of said motor are controlled in accordance with the command value of said single command signal.

2. An apparatus according to claim 1, wherein said continuous command forming circuit forms a continuous command signal representing a command value which varies linearly.

3. An apparatus according to claim 2, wherein said continuous command forming circuit linearly varies the amplitude signal in accordance with a linear change of the continuous command signal.

4. An apparatus according to claim 3, wherein the first phase difference is 90 degrees and the second phase difference is −90 degrees.

5. An apparatus according to claim 4, wherein said first control circuit controls an amplitude value of the frequency voltage in accordance with the value of the amplitude signal.

6. An apparatus according to claim 1, wherein the motor apparatus moves an object relative to the vibration member by the driving force, and said continuous command forming circuit forms a continuous command signal corresponding to a difference between a target driving amount and an amount of relative movement of the vibrating member.

7. An apparatus according to claim 6, wherein said continuous command forming circuit forms a continuous command signal corresponding to a speed of the object relative to the vibrating member.

8. A vibration wave motor apparatus having a frequency signal forming circuit for forming a frequency signal; a phase shift circuit for shifting a phase of the frequency signal; a first electro-mechanical energy conversion element to which a frequency signal from the signal forming circuit is applied; and a second electro-mechanical energy conversion element to which a frequency signal phase shifted by the phase shift circuit is applied; for generating a first driving force in a first driving direction when a phase shift value of the phase shift circuit is a first phase shift value, and for generating a second driving force in a second driving direction opposite the first driving direction when a phase shift value of the phase shift circuit is a second phase shift value; and for varying a driving speed in response to an amplitude value of the frequency signal, the vibration wave motor apparatus comprising:

(a) a continuous command forming circuit for forming a single continuous command including a command value which varies linearly;

(b) an amplitude signal forming circuit for forming an amplitude signal which varies linearly from a first amplitude value to a second amplitude value when the command value varies from a predetermined command value to a first command value, and for forming an amplitude signal which varies linearly from the first amplitude value to the second amplitude value when the command value varies from the predetermined command value to a second value in a direction opposite the first command value;

(c) a phase difference signal formation circuit for supplying the first shift value to said phase shift circuit when the command value is a value which is shifted in a direction from the predetermined command value to the first command value, and for supplying the second phase shift value to said phase shift circuit when the command value is a value which is shifted in a direction from the predetermined command value to the second command value; and an adjusting circuit for varying the amplitude value in accordance with the value of the amplitude signal.

9. A vibration wave motor apparatus having a frequency signal forming circuit for forming a frequency signal; a phase shift circuit for shifting a phase of the frequency signal; a first electro-mechanical energy conversion element to which a frequency signal from the frequency signal forming circuit is applied; and a second electro-mechanical energy conversion element to which a frequency signal phase shifted by the phase shift circuit is applied; for generating a first driving force in a first driving direction when a phase shift value of the phase shift circuit is a first phase shift value, and for generating a second driving force in a second driving direction opposite the first driving direction when a phase shift value of the phase shift circuit is a second phase shift value; and for varying a driving speed in response to an amplitude value of the frequency signal, the vibration wave motor apparatus comprising:

(a) a continuous command forming circuit for forming a single continuous command signal including a command value;

(b) an amplitude signal forming circuit for forming an amplitude signal which varies from a first amplitude value to a second amplitude value when the command value varies from a predetermined command value to a first command value, and for forming an amplitude signal which varies from the first amplitude value to the second amplitude value when the command value varies from the predetermined command value to a second command value in a direction opposite the first command value;

(c) a phase difference signal forming circuit for supplying the first shift value to said phase shift circuit when the command value is a value which is shifted in a direction from the predetermined command value to the first command value, and for supplying the second shift value to said phase shift circuit when the command value is a value which is shifted in a direction from the predetermined command value to the second command value; and (d) an adjusting circuit for varying the amplitude value in accordance with the amplitude signal.

10. A vibration wave motor apparatus having a frequency signal forming circuit for forming a frequency signal; a phase shift circuit for shifting a phase of the frequency signal; a first electromechanical energy conversion element to which a frequency signal from said forming circuit is applied; and a second electromechanical energy conversion element to which a frequency signal phase shifted by the phase shift circuit is applied; for generating a first driving force in a first direction when a phase shift value of the phase shift circuit is a first phase shift value, and for generating a second driving force in a second direction opposite the first direction when a phase shift value of the phase shift circuit is a second phase shift value, the vibration wave motor apparatus comprising:

(a) a continuous command forming circuit for forming a command value; and (b) a function circuit for varying an amplitude value of the frequency signal in accordance with a change in the command value, and for selectively supplying the first shift value or the second shift value to the phase shift circuit in accordance with the command value.

11. A vibration wave motor apparatus for generating a driving force by applying a frequency voltage having a phase difference to an electromechanical energy conversion element disposed on a vibration member, and for driving the vibration member relative to a contact object contacting the vibration member, comprising:

(a) a continuous command forming circuit for forming a command value; and (b) a function circuit for varying an amplitude of the frequency voltage in accordance with a change in the command value, for adjusting the speed, and for supplying a first phase difference or a second phase difference between the frequency voltages in accordance with the command value.

12. A vibration motor apparatus, in which frequency voltages having predetermined phase differences are applied to an electromechanical energy conversion element portion disposed on a vibration member, said conversion element portion including a plurality of electro-mechanical energy conversion element groups to each group of which a respective voltage signal having a different phase is applied, thereby generating in the vibration member a vibration as a driving force, the apparatus comprising:

a continuous command forming circuit for forming a single continuous command signal representing a command value which varies within a predetermined range from a first command value to a second command value including a predetermined command value located therebetween;

a control signal forming circuit for forming a control signal having a corresponding speed control value for a command value when the command value varies from the first command value to the second command value, said control signal forming circuit forming a control signal which shifts the speed control value from a first value to a second value when the command value shifts from the predetermined command value in a direction of the first command value, and forming a control signal which shifts the speed control value from the first value to the second value when the command value shifts from the predetermined command value in a direction of the second command value, opposite in direction to the first command value;

a phase difference signal forming circuit for forming a first phase difference signal representing a first phase difference when a command value represented by the continuous command signal indicates a command value shifted from the predetermined command value in a direction of the first command value, said first phase difference generating a driving force in a first driving direction of the motor, and for forming a second phase difference signal representing a second phase difference when a command value represented by the continuous command signal indicates a command value shifted from the predetermined command value in a direction of the second command value, said second phase difference generating a driving force in a second driving direction of the motor, opposite the first driving direction of the motor;

a first control circuit for adjusting a characteristic value of the frequency voltage and for controlling a motor speed to a value corresponding to the value of a control signal from said control signal forming circuit; and a phase difference setting circuit for setting a phase difference of the frequency voltage to a first phase difference in response to a first phase difference signal from said phase difference signal forming circuit, and for setting a phase difference of the frequency voltage to a second phase difference in response to a second phase difference signal from said phase difference signal forming circuit, such that the motor generates a driving force in a first driving direction when the frequency voltage has the first phase difference, and generates a driving force in a second driving direction opposite the first driving direction when the frequency voltage has the second phase difference.

\* \* \* \* \*

UNITED STATES PATENT AND TRADEMARK OFFICE
CERTIFICATE OF CORRECTION

PATENT NO.  : 5,874,799
DATED       : February 23, 1999
INVENTOR(S) : REIJI MITARAI, ET AL.

It is certified that error appears in the above-identified patent and that said Letters Patent is hereby corrected as shown below:

Drawings:

SHEET 2

"PLASE" should read --PHASE--.

SHEET 13

"TROUGH" should read --THROUGH--.

COLUMN 1

Line 34, "operation;" should read --operation:--.

COLUMN 3

Line 33, "if" should read --it--.

COLUMN 9

Line 6, "a" should read --an--. (2nd occurrence)

COLUMN 12

Line 5, "calculation;" should read --calculation:--.

COLUMN 15

Line 41, "an" should read --(d) an--.

UNITED STATES PATENT AND TRADEMARK OFFICE
CERTIFICATE OF CORRECTION

PATENT NO. : 5,874,799
DATED : February 23, 1999
INVENTOR(S) : REIJI MITARAI, ET AL.

It is certified that error appears in the above-identified patent and that said Letters Patent is hereby corrected as shown below:

<u>COLUMN 16</u>

Line 20, "electromechanical" should read --electro-mechanical--.

Line 22, "electromechanical" should read --electro-mechanical--.

Line 40, "electromechanical" should read --electro-mechanical--.

Line 54, "electromechanical" should read --electro-mechanical--.

Signed and Sealed this

Twenty-first Day of September, 1999

Q. TODD DICKINSON

*Attest:*

*Attesting Officer*    Acting Commissioner of Patents and Trademarks